United States Patent

Calusinski

[19]

[11] Patent Number: 5,823,426
[45] Date of Patent: Oct. 20, 1998

[54] RAILWAY PLATE AND METHOD OF MANUFACTURE

[75] Inventor: Richard Robert Calusinski, Vista, Australia

[73] Assignee: Everts & Van Der Weijden Exploitatie, Viking Hof, Netherlands

[21] Appl. No.: 766,515

[22] Filed: Dec. 13, 1996

[30] Foreign Application Priority Data

Apr. 13, 1995 [AU] Australia .................................. PN2448

[51] Int. Cl.⁶ .................................................. E01B 9/00
[52] U.S. Cl. ............................ 238/272; 238/287; 238/349
[58] Field of Search ...................................... 238/264, 267, 238/272, 287, 349, 351, 352, 353, 354, 302, 331, 338

[56] References Cited

U.S. PATENT DOCUMENTS

| | | | |
|---|---|---|---|
| 4,267,970 | 5/1981 | Lubbers | 238/349 |
| 5,522,542 | 6/1996 | Ciecielski | 238/349 |

FOREIGN PATENT DOCUMENTS

| | | |
|---|---|---|
| 12134/76 | 9/1977 | Australia . |
| 47728/79 | 12/1979 | Australia . |
| 0206618 | 12/1986 | European Pat. Off. . |
| 2101434 | 7/1971 | Germany . |
| 27 00 245 | 7/1977 | Germany . |
| 582452 | 8/1993 | Germany . |
| 251233 | 6/1926 | United Kingdom . |
| WO82/00669 | 3/1982 | WIPO ..................................... 238/351 |

*Primary Examiner*—Mark Tuan Le
*Attorney, Agent, or Firm*—Perman & Green, LLP

[57] ABSTRACT

A rail fastening plate used to secure a railway rail to a sleeper or other rail foundation uses a spring clip. The plate includes a base section adapted to be secured to a rail foundation by securing bolts passing through each of a plurality of apertures in the base section. A pair of spaced raised ribs upstanding from an upper surface of the base section, the ribs being spaced apart so as to receive a railway rail therebetween. Channels cut across the ribs are shaped to include narrowed outer sections and a wider central section. The narrowed sections act as a gate through which the clip must pass and which serves to retain the clip in position.

6 Claims, 5 Drawing Sheets

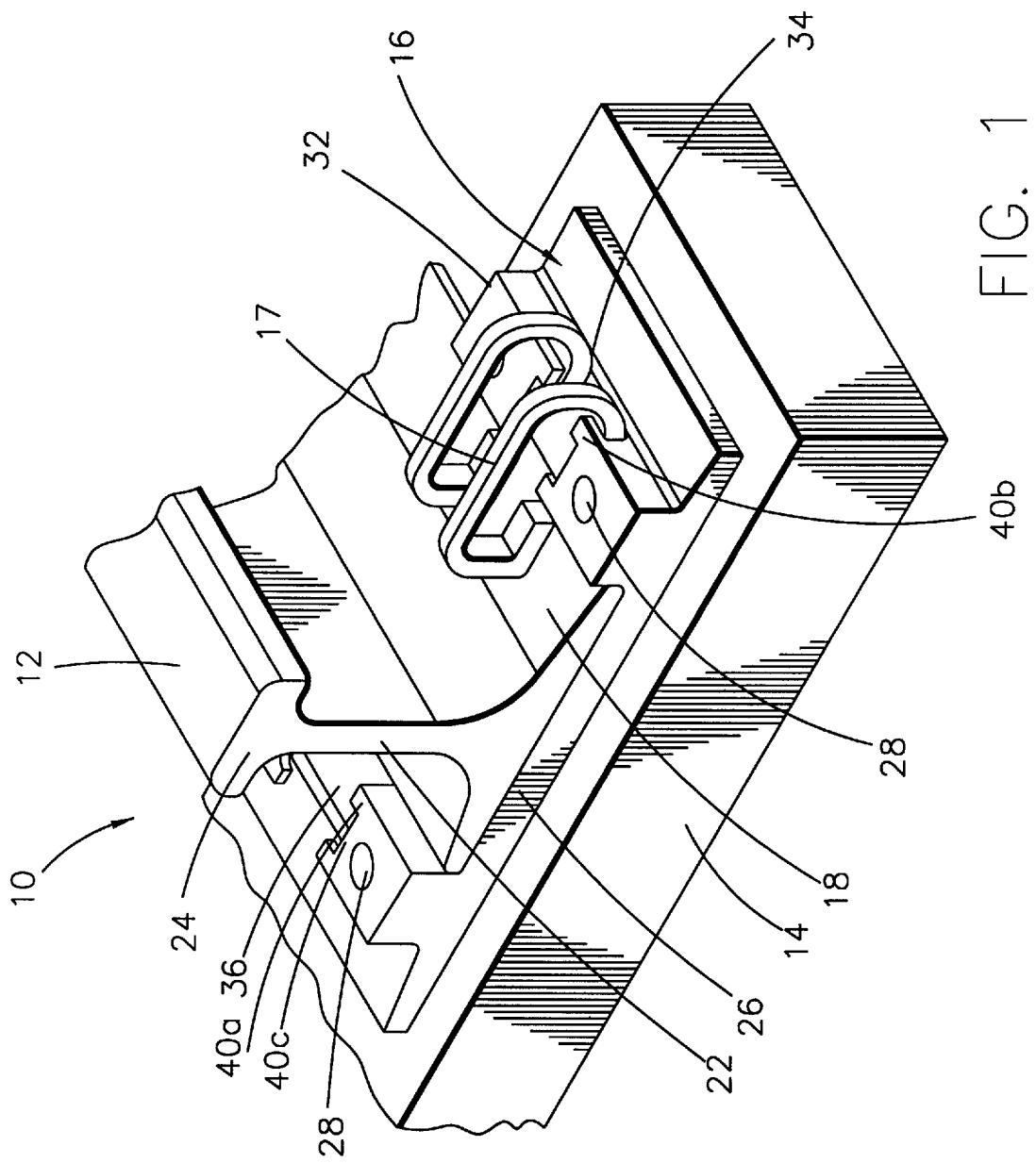

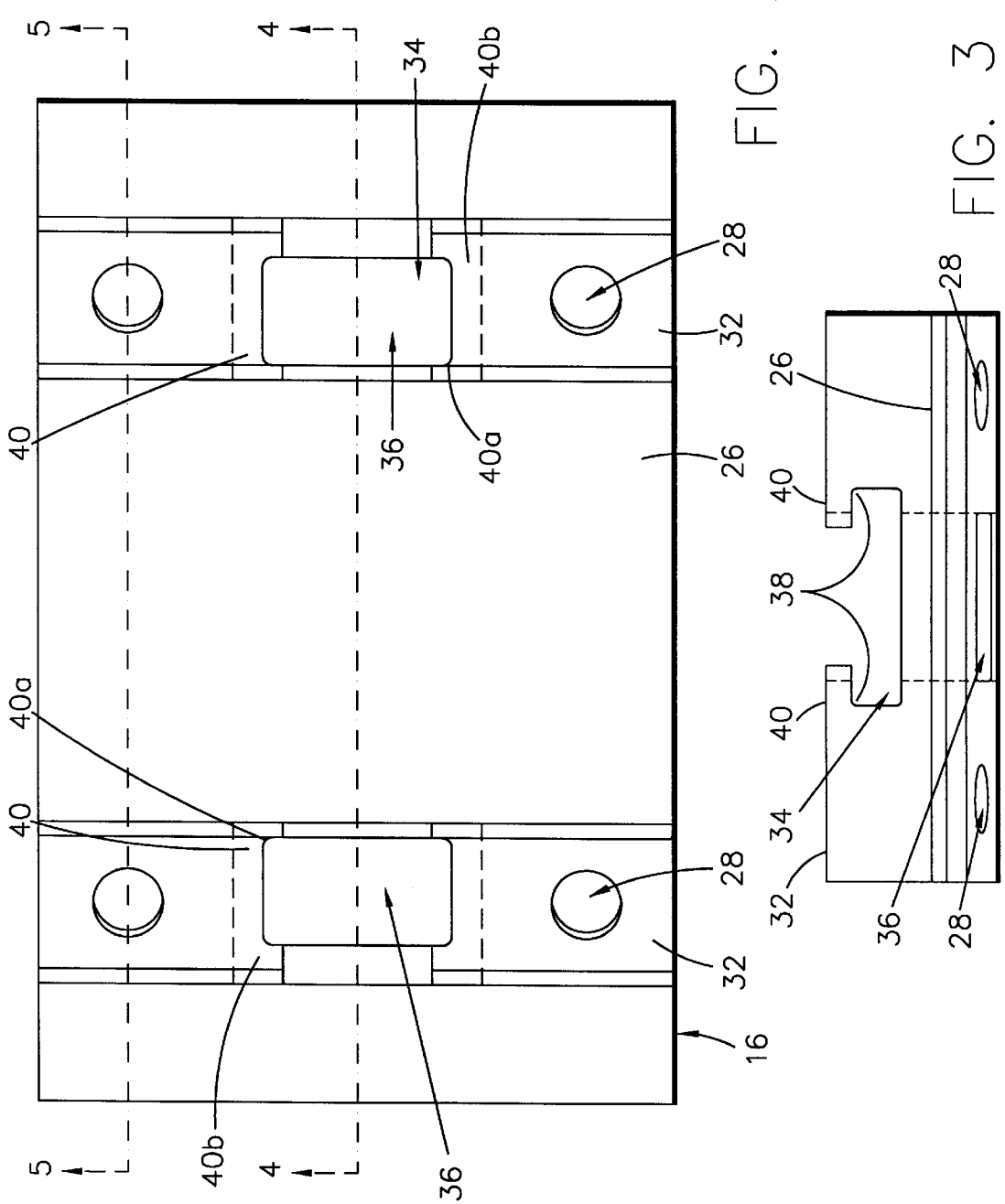

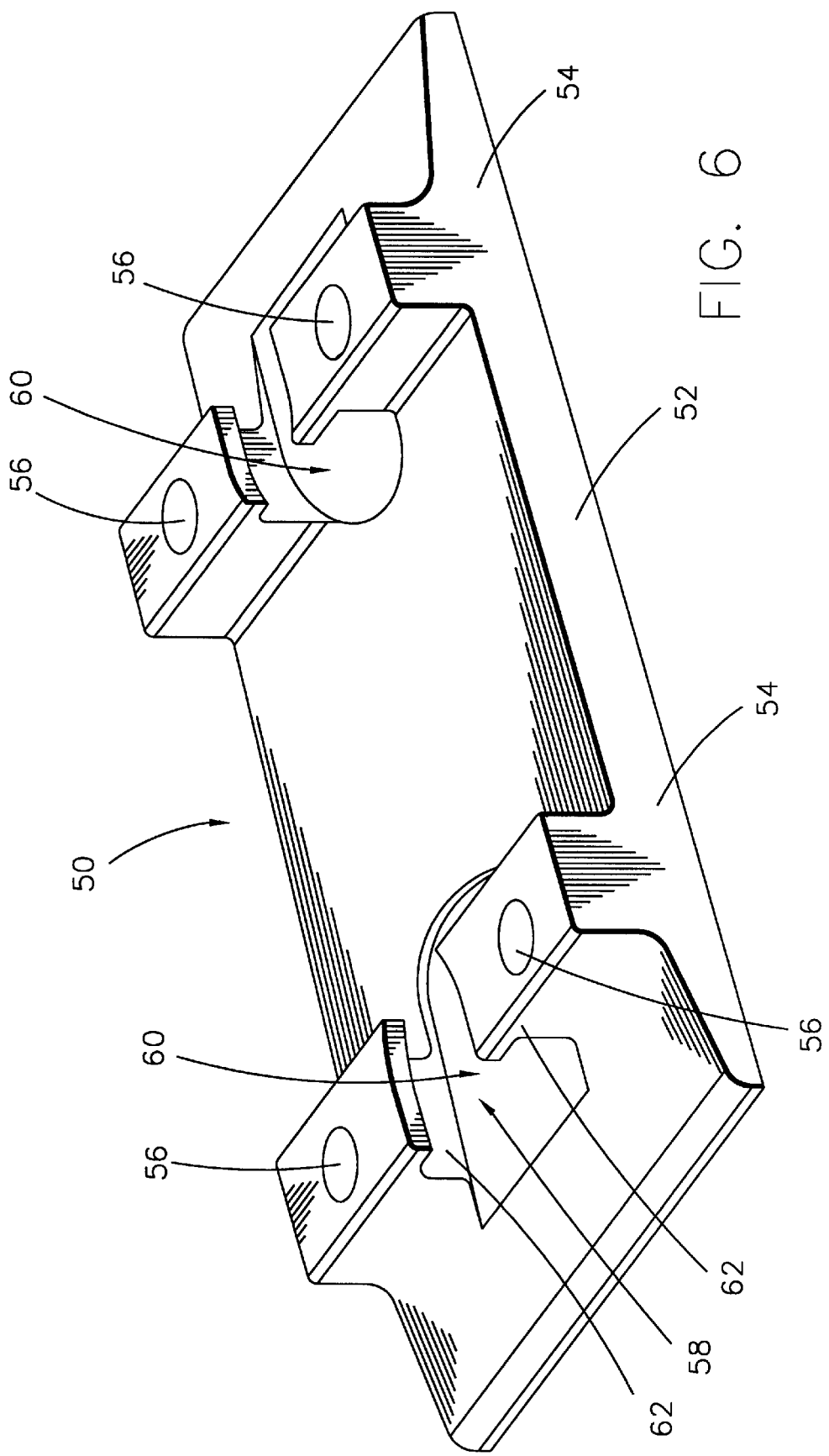

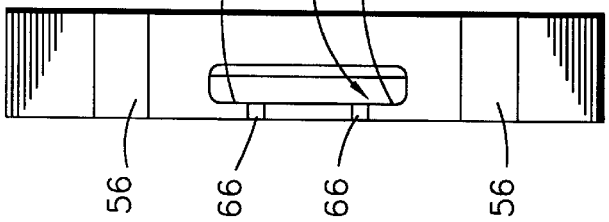
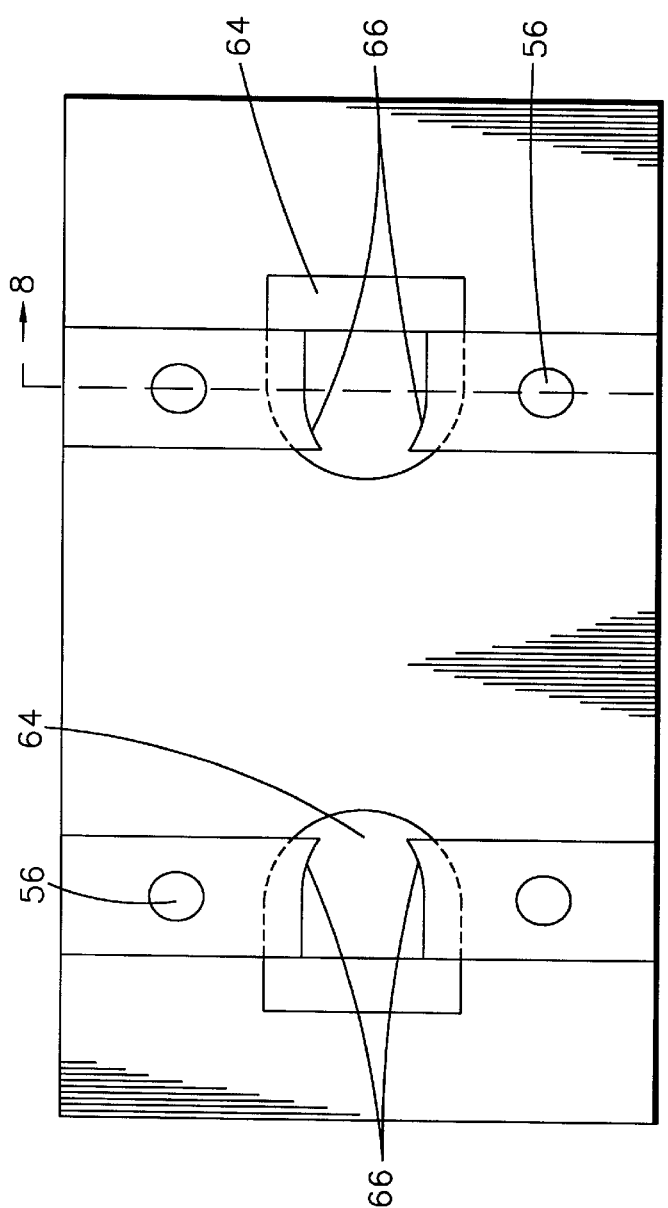
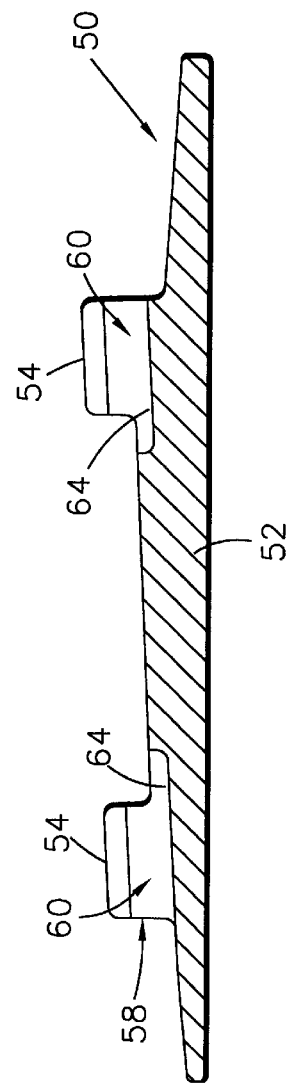

RAILWAY PLATE AND METHOD OF MANUFACTURE

This application is a Continuation-In-Part of application no. PCT/AU96/00214 filed Apr. 13, 1995.

TECHNICAL FIELD

The present invention relates to a rail base plate used to secure a railway rail to a sleeper or other rail foundation using a spring clip. In particular, the present invention is concerned with railway base plates that are economical to manufacture and are useful with a number of clip designs available.

BACKGROUND ART

Traditional railway rail base plates are formed from cast metal specifically suited for use with clips designed to hold a rail in position. Such a plate would typically include a base member having a central channel adapted to receive a railway rail, the central channel being bounded on opposing sides by an upstanding shoulder on the base. The shoulder includes a cutaway portion for receiving a clip to hold the rail in place, the cut away portion being formed in the shape of an inverted "Y".

Conventional railway base plates of this type, known as "K" plate is illustrated in European Patent Application No. 0206618 (Pandrol Limited).

For many years non resilient clips were used to secure a rail in position on the base plate. Base plates of this type are most commonly made by casting procedure and for this reason the plates are regarded as relatively expensive items and, although the non-resilient clips have now been discarded in favour of newer clips such as those disclosed in EP 0206618, the original "K" plates are still in use in many locations, and, because of this clips have been designed so as to be compatible with existing plates.

Thus, clips such as those shown in British Patent No. 1217531 are made so as to be insertable onto existing base plates. These resilient clips are generally of an open "D" configuration in side elevation, and in plan view comprise a pair of parallel arms joined at one end and bent to form the "D" configuration in the vertical plane. The conventionally used method of attachment for such a clip involves a multi-stage process. Firstly, the arms are clamped together and the clip is placed on the rail shoulder in the clamped position, the clip being subsequently driven into position. Furthermore, because of this action, clips cannot be pre-loaded onto base plates to allow rapid rail assembly to occur. To attempt such a procedure would require the clips to be placed on the plate in a compressed condition which would be undesirable because of the clip springing out of position and potentially being harmful.

The shape of the plate is such that, in most cases, the plate needs to be made by a casting procedure. Further, In many cases the geometry of the clip is such that a coring procedure is also required. Such processes are relatively expensive and, where the pieces are used in very large numbers as is the case with railway rail fastening plates, the cost of an individual unit is very significant. Such plates as are available to be manufactured by lower cost processes are typically specific to one clip and are therefore less useful.

The use of a railway rail fastening plate formed of rolled metal rather than cast metal would be preferable because of the very much lower cost of an item made by such a process.

It is an object of the present invention to provide a railway rail base plate which is capable of being formed from rolled metal such as rolled steel. Advantageously, railway rail plate of the present invention is also useful with a number of currently available clips.

The present invention is also directed to a plate to which a clip can be attached in a single step process, without the need for prior compression of the arms of the clip.

It is also an object of the present invention to provide a base plate into which a clip can be pre loaded in a loosely engaged, non-compressed condition.

DISCLOSURE OF THE INVENTION

Therefore, according to one aspect of the present invention, there is provided a railway base plate comprising:

a base section adapted to be secured to a rail foundation by securing means passing through each of a plurality of apertures in the base section;

a pair of spaced upstanding ribs formed on an upper surface of the base section, the ribs being spaced to receive a railway rail therebetween and having an innermost wall directed towards the centre of the base section;

each rib having a generally central channel extending across the rib at right angles thereto;

the channel including side walls which are cut into the rib and extend into the rib below the upper surface of the rib thereby creating an uppermost overhanging portion extending over a cavity created in the rib;

and wherein the walls of the channels are narrowed at their upper most edges adjacent either end of the rib to create gate sections.

The shape of the railway rail fastening plate of the present invention is such that the plate can be manufactured from a rolled metal such as rolled steel and subsequently shaped in machining and/or punching operations.

The curvature of the inner wall of the channels allow the channels to be narrowed towards the centre of the base plate in a smooth fashion. It is therefore possible to drop a resilient rail fastening clip of the type previously described, into the channels such that the front parallel arms fall behind the narrowed section of the channels. The clip is thereby loosely engaged on the plate and this arrangement can be used to pre load the clip if necessary. To secure the clip in position, all that is required is that the clip is driven generally horizontally by a blow. This will force the arms of the clip against an inner wall of the overhang, the arms of the clip being compressed as it moves along an inner wall of the channels until it is able to pass through the narrowed section which subsequently acts as a gate. The curved wall of the overhang enables the compression to occur smoothly in response to an impact.

The channel into the raised portions may extend fully through the raised portion and the base section of the base plate, or, alternatively, the slot may extend through the raised portions only.

In some embodiments of the present invention, the base plate may also include a recess portion generally co-incident with the aperture formed in the base of the channel, the recess serving as a seat for a rail securing clip.

In one embodiment the inner walls of the overhand portions are additionally curved so as to narrow the slots towards an outer edge of the ribs. This type of shape can be utilised to pre load resilient rail securing clips onto a base plate in such a way that the clips will be loosely engaged and will remain on the base plate without any need for the clips to be tensioned.

BRIEF DESCRIPTION OF THE DRAWINGS

The present invention will now be described, by way of the following non-limiting example, in which;

FIG. 1 illustrates in perspective view a railway rail attached to a rail foundation using a plate in accordance a first embodiment of the present invention;

FIG. 2 illustrates in plan view the plate of FIG. 1;

FIG. 3 illustrates an end view of the plate of FIG. 1;

FIG. 6 illustrates in perspective view a rail plate in accordance with a second embodiment of the present invention;

FIG. 7 illustrates in plan view the plate of FIG. 6;

FIG. 8 illustrates a cross-sectional view of the plate of FIG. 6 drawn through the line 8'—8'; and FIG. 9 illustrates a cross-sectional view of the plate of FIG. 6 drawn through the line 9'—9'.

DESCRIPTION OF PREFERRED EMBODIMENT

Figure 4:
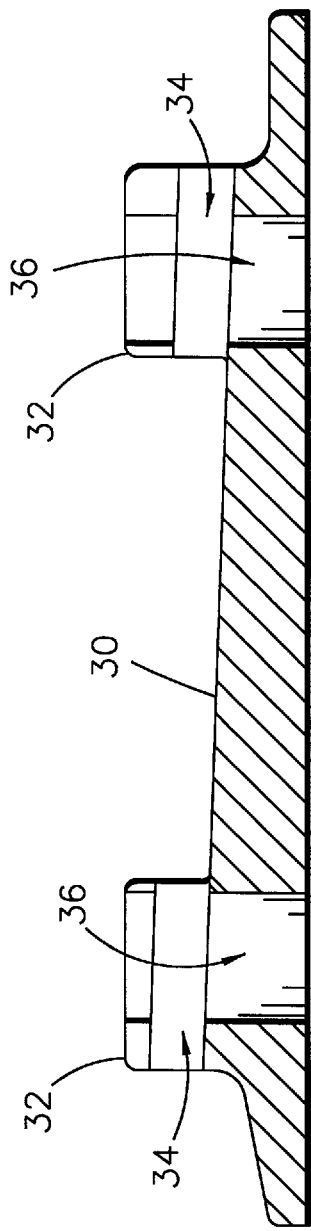
FIG. 4 illustrates a cross-sectional view of the plate of FIG. 2 drawn through the line 4'—4'.

Shown in FIG. 1 is a portion of a railway assembly 10 comprising a railway rail 12 attached to a rail foundation 14 by means of an intermediary railway rail base plate 16 and fastening spring clip 17. The rail 12 is of traditional shape and includes a lowermost rail foot 18, the rail foot 18 having a rail member 22 upstanding therefrom and terminating in a rail head 24.

Figure 5:
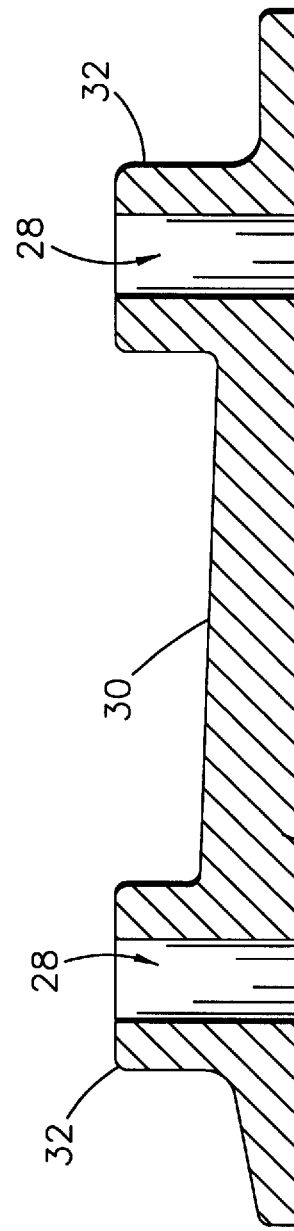
FIG. 5 illustrates a cross-sectional view of the plate of FIG. 2 drawn through the line 5'—5'.

The base plate 16 can be seen most clearly in perspective view in FIG. 1 and in cross sectional views in FIGS. 4 and 5. The base plate 16 includes a slat, lowermost surface 26 which rests on the rail foundation 14.

The base plate 16 further includes an upper surface 30 which is inclined with respect to the rail foundation 14.

The base plate 16 also comprises a pair of spaced ribs 32 upstanding from the upper surface 30. The ribs 32 are spaced apart so as to receive the railway rail 12 therebetween, such that the ribs 32 extend generally parallel to the direction of the rail 12. As can be seen from FIG. 1 the rail foot 18 is a snug fit between the ribs 32. Moreover, it can also be seen that the ribs 32 are higher than the rail foot 18.

The base plate 16 is secured to the rail foundation typically by means of securing anchors (not shown) passing through apertures 28 in the base plate 16 and into the rail foundation 14. In the embodiment shown the apertures 28 are coincident with the raised ribs 32 and extend therethrough. The position selected for the apertures 28 is entirely optional, although there may be some benefit in utilising the extended contact which is created between a securing anchor and the aperture 28 when this is formed in the ribs 32.

Each rib 32 includes a generally central channel 34 extending across the rib and at right angles thereto. The channels 34 are used to hold and retain the spring clips 17 in position. Each channel 34 is created with a geometry which assists in the installation of the clip 17 in a manner which ensures that the clip 17, which is elastically deformable, can be easily inserted and securely retained, thereby securing the rail 12 to the plate 16.

In side view, facing in a direction transversely to the direction of the rail 12, as shown in FIG. 3, it can be seen that the channel 34 has an open upper end 36. It can also be seen that the channels 34 are bounded on their vertical sides by the ribs 32 and that on each side the ribs have been cut into, creating an undercut portion and leaving an overhanging portion of the rib 38. The channel 34 is therefore narrower at the upper surface of the ribs 32 and widens below the overhang portions 38. Moreover, it can be seen from FIG. 3 in particular, that the overhanging portions 38 are formed so as to be generally parallel to the upper surface of the ribs 32 and that the cavity formed by the undercut portion is essentially square in cross section. From FIG. 1 it can be seen that the spring clip 17 is of the open "D" configuration referred to above and that the parallel arms of the clip are of approximately square cross-section. The space defined by the sidewall of the ribs 32 and the underside of the overhanging portion is sized so as to comfortably accommodate a respective limb of the clip 17 on each side of the cannel 34. The overhanging portion 38 serves to prevent upward movement of the clip 17.

Further, the geometry of the channels 34 at an upper surface of the ribs 32 is of importance. In particular, the profile of the inner edge of each of the overhanging portions 38 comprises a central recess 40c to provide gate sections through which the clip 17 must pass in order to be loaded onto the plate 16.

As shown in FIGS. 1 and 2 the channels 34 are of varying width at the upper surface of the rib 32 as determined by the edge profile of the overhanging portions 38.

In each case on the side of the channel 34 closest to the rail 12 the upper edge of the channel 34 is slightly closed off inwardly to produce a gate effect. From top view (FIG. 2) this can be seen in the form of inwardly directed projections 40a on the upper surface of the ribs 32 adjacent the channel 34. Behind the projections 40a (i.e. further from the rail 12) the edge of the channel 34 widens. Finally, an outermost edge of the ribs 32 the channels 34 are again narrowed to form a further gate. The inner edge of the channel 34 is narrowed adjacent the upper surface 40 of the ribs 32 forming a second pair of inwardly directed projections 40b.

The shape and position of the projections 40a and 40b are contrived to assist the loading of the clip 17 onto the rail 12, and prevent the clip 17 from disengaging during the loading process.

The outer projections 40b ensure that when the clip 17 is removed from the rail 12, the clip 17 remains loosely on the plate 18. In particular it is to be noted that the uppermost edge of the channels 34 is curved between the wider central portion of the channel and the narrower "entrance" and "exit" formed by the projections 40a and 40b. This curved wall allows for the limbs of the clip to be compressed in a driving action.

As can be seen, the clips 17 are of a generally "D" shaped configuration in side view and in plan view comprise a pair of parallel arms joined at a rear end. In use, the clips 17 are dropped into position on the base plate 16 such that the front of the parallel arms are located behind the projections 40a. By driving against the clip 17 using an appropriate tool the clip is compressed and pushed through the narrow sections created by projections 40a and 40b into the retained position shown in FIG. 1.

The base plate 16 of the present invention is such that the plate 16 can be manufactured from a rolled metal such as rolled steel and subsequently shaped in machining and/or punching operations.

Thus, in the embodiment of the invention illustrated in FIGS. 1–5, the plate 16 is manufactured according to the following method.

Firstly, a section of steel plate is rolled to a predetermined profile to produce a plate having the base section 26 and the pair of spaced raised rib portions 32 upstanding from an upper surface of the base section.

The plate is then machined or punched to form a plurality of apertures 28. A further punching or machining operation creates the profile of the channel 34 as it is seen in top view in FIG. 3.

The further punching or machining operation has the effect of creating the cuts into the side walls of the channels 34 and leaves the overhanging portions 38 as defined above. FIGS. 4 and 5 assist in interpreting how the combined effect of the punching/machining produces the geometry of the channel 34 as described.

FIGS. 6–9 illustrate a second embodiment of the present invention in the form of a railway rail fastening plate 50.

The use of the plate is in all respects similar to that of the plate 16 illustrated in FIGS. 1–5.

The plate 50 comprises a base section 52 and upstanding raised ribs 54. The raised ribs 54 are spaced apart so as to receive a rail therebetween. The raised ribs 54 also include apertures 56 therein for securing the plate 50 to a rail foundation. As with the rail plate 16, the plate 50 has an inclined surface. The raised ribs 54 each have a channel 58 extending therethrough and an opening 60 in the channel 58 at the upper surface of the rib 54.

The channel 58 is formed in a milling operation and extends laterally beyond the opening 60 into the raised ribs 54 thereby creating regions of undercut 62 in the ribs 54.

There are additionally recesses 64 cut into the upper surface of the base section 52, the recess 64 being located in the channels 58. As will be appreciated from the cross sectional view shown in FIG. 9, the recesses 64 are generally parallel with a lower face of the plate 50 and therefore, are steeper towards the centre of the plate 50. The recesses 64 serve as a seat for a spring clip, typically of the plan view shown in FIG. 7. The recesses 64 have a generally circular inner wall against which a clip can abut in use.

The opening 60 is also profiled so as to be narrower towards the centre of the plate 50. The narrowing of the aperture creates inner projections 66 which act as a gate in use, a spring clip being urged through the gate and then retained in position by the inner projections 66.

Conveniently, the plate 50 is manufactured in a simple milling operation, the apertures, slots and recesses all being created by milling areas from a section of plate of appropriate profile.

The plate of the present invention is therefore readily manufactured from rolled steel plate by the above method.

Throughout this specification various indications are given as to the scope of the invention however, the invention is not limited to any one of these but may reside in two or more combined together. The examples are given for illustration only and not for limitation.

What is claimed is:

1. A railway base plate comprising:

a base section adapted to be secured to a rail foundation by securing means passing through each of a plurality of apertures in the base section;

a pair of spaced upstanding ribs formed on an upper surface of the base section, the ribs being spaced to receive a railway rail therebetween and having an innermost wall directed towards the center of the base section;

each rib having a generally central channel extending across the rib at right angles thereto;

the channel including side walls which are cut into the rib and extend into the rib below the upper surface of the rib thereby creating a pair of uppermost overhanging portions extending over a cavity created in the rib; and wherein the pair of overhanging portions have end faces facing each other and central recesses at said end faces to create gate sections.

2. A railway fastening plate according to claim 1, in which the plate is manufactured from a rolled metal and subsequently shaped in machining and/or punching operations.

3. A railway base plate according to claim 2, wherein the channels include a widened central area between the end faces so as to allow a spring clip to be located within the channel and to be loosely retained therein prior to being engaged on a rail foundation, the gate sections serving to prevent disengagement of the clip.

4. A railway base plate according to claim 1, wherein the end faces are curved from the widened central area to the gate sections.

5. A railway base plate according to claim 1, in which the apertures in the base section are formed in the upstanding ribs.

6. A railway base plate according to claim 1 in which the channels are further provided with a base recess formed in a base of the channels, the base recess serving as a seat to maintain the position of a retained spring clip.

* * * * *